United States Patent [19]

Andrews

[11] Patent Number: 4,518,137

[45] Date of Patent: May 21, 1985

[54] AERODYNAMIC BRAKING SYSTEM FOR A SPACE VEHICLE

[75] Inventor: Dana G. Andrews, Seattle, Wash.

[73] Assignee: The Boeing Company, Seattle, Wash.

[21] Appl. No.: 90,296

[22] Filed: Nov. 1, 1979

[51] Int. Cl.³ .............................................. B64G 1/58
[52] U.S. Cl. .............................. 244/113; 244/110 D; 244/117 A; 244/162; 244/163
[58] Field of Search ............ 244/110 D, 113, 117 A, 244/138 R, 158, 160, 162, 163, 169, 172; 102/4, 105

[56] References Cited

U.S. PATENT DOCUMENTS

| | | | |
|---|---|---|---|
| 3,053,476 | 9/1962 | Mohar | 244/138 R |
| 3,113,750 | 12/1963 | Beardsley | 244/117 A |
| 3,242,982 | 3/1966 | Sherman | 244/163 |
| 3,286,951 | 11/1966 | Kendall | 244/162 |
| 3,321,154 | 5/1967 | Downs | 244/163 |
| 4,014,485 | 3/1977 | Kinnaird et al. | 244/163 |

*Primary Examiner*—Charles E. Frankfort
*Assistant Examiner*—Rodney A. Corl
*Attorney, Agent, or Firm*—Delbert J. Barnard; Joan H. Pauly

[57] ABSTRACT

Liquid hydrogen stored aboard a space vehicle, and constituting a fuel for use in the vehicle's main rocket motor, is introduced, in a gaseous state, into an inflatable aerodynamic braking member, for moving it from a collapsed stored position outwardly into an inflated operational position. Such member provides a large area braking surface which extends generally laterally outwardly from the space vehicle. During reentry the space vehicle is oriented to reenter nozzle end first. Fuel is consumed within the rocket motor to produce gases which are discharged out through the rocket nozzle to provide a cooling layer of gases forwardly of the large area braking surface. A space vehicle equipped with such an aerodynamic braking system is operated to reenter into the atmosphere. The drag produced by the braking member slows the space vehicle down and then the space vehicle is set into a low earth orbit.

17 Claims, 17 Drawing Figures

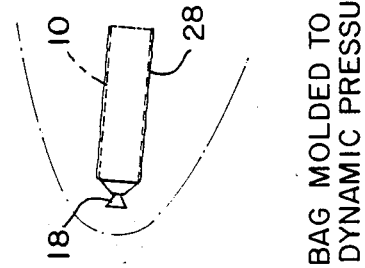
FIG. 10
t = 0 SEC, h=400,000ft
q = 0.015 psf
RE-ENTRY CONFIGURATION
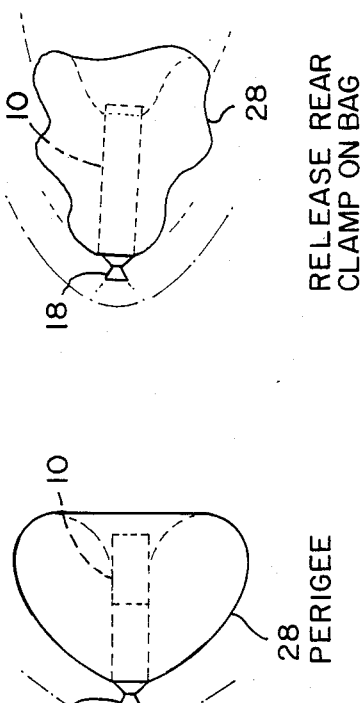
FIG. 11
t = 100 SEC, h=273,000ft
q = 8.5 psf
PERIGEE
FIG. 12
t = 250 SEC
q = 1.5 psf
RELEASE REAR CLAMP ON BAG
FIG. 13
t = 300 SEC
q = 0.5 psf
BAG MOLDED TO OTV BY DYNAMIC PRESSURE
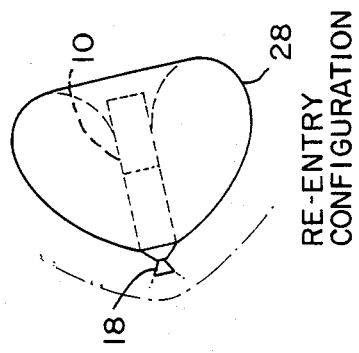
FIG. 14
t = 320 SEC
q = 0.3 psf
FRONT CLAMP RELEASED ON BAG
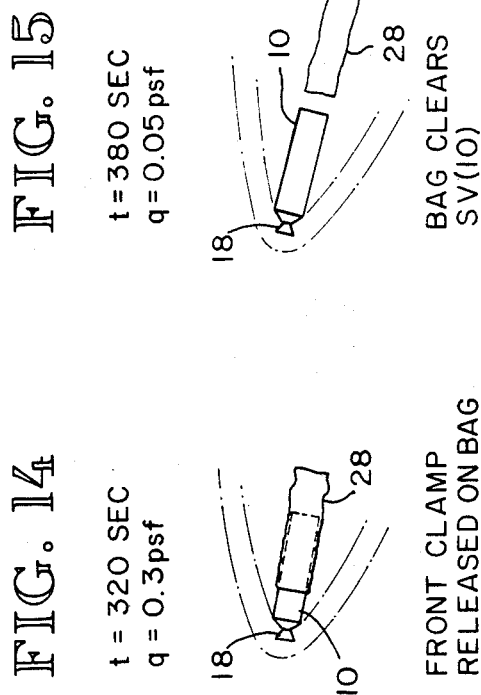
FIG. 15
t = 380 SEC
q = 0.05 psf
BAG CLEARS SV(10)
FIG. 16
t = 400 SEC
q = 0.03 psf
ENGINE SHUTDOWN
FIG. 17
t = 0.75 HOUR
CIRCULARIZATION BURN

AERODYNAMIC BRAKING SYSTEM FOR A SPACE VEHICLE

BACKGROUND OF THE INVENTION

1. Field of the Invention

This invention relates to an aerodynamic braking system for use in recovering a space vehicle, and for returning a space vehicle from space and placing it into a low earth orbit where it can be recovered and/or refurbished for reuse.

2. Description of the Prior Art

A principal object of the present invention is to provide a low cost system for rendering a space vehicle reusable. There is a need for such a system for use, for example, with space vehicles planned for traveling round trip between a low earth orbit (LEO) and a geosynchronous earth orbit (GEO) —a mission which will involve a change in velocity of approximately 28,670 feet per second during the round trip.

The kinetic energy of a spacecraft during reentry is many times greater than the amount of energy which in terms of heat, would be needed to bring about complete vaporization of the spacecraft. Retardation and friction with the air on reentry into the earth's atmosphere would release a considerable amount of heat and burn up the reentering body. Indeed, this is the normal fate of meteorites entering the atmosphere from outer space.

The "ablating reentry shield" is a known successful way of preventing space vehicle destruction during reentry. Made of ablative material, the shield dissipates heat by melting and vaporizing. Friction with the air heats the ablative material to a temperature of several thousand degrees centigrade, so that the material becomes liquid and "boils off". The zone immediately behind a shock wave which is formed ahead of the returning space vehicle is heated to about 6,000° C. and is in the gaseous state. About 80% of the thermal energy from the intermediate layer between the liquid and the gaseous layer is dissipated as radiation to the surrounding air. The low conductivity of the still-solid ablative material prevents any substantial amount of heat from penetrating into the space vehicle itself during the reentry. (Which is only 200–300 seconds in duration.)

Ablative insulation is lightweight and is adequate for the heat load encountered during a reentry, but it requires that the vehicle be returned to the earth after each flight for a very expensive refurbishment.

Many proposals of using a fluid layer for protecting an aircraft and/or reentry vehicle surface against overheating may be found in the patent literature. Examples of such systems are disclosed by the following U.S. patents:

U.S. Pat. No. 1,426,907, granted Aug. 22, 1922, to George Ramsey;
U.S. Pat. No. 2,468,820, granted May 3, 1949, to Robert H. Goddard;
U.S. Pat. No. 2,995,317, granted Aug. 8, 1961, to Fritz Schoppe;
U.S. Pat. No. 3,026,806, granted Mar. 27, 1962, to Leslie A. Runton and Henry C. Morton;
U.S. Pat. No. 3,062,148, granted Nov. 6, 1962, to John P. Le Bel;
U.S. Pat. No. 3,113,750, granted Dec. 10, 1963, to Melville W. Beardsley;
U.S. Pat. No. 3,259,065, granted July 5, 1966, to Don H. Ross and Eugene S. Rubin;
U.S. Pat. No. 3,298,637, granted Jan. 17, 1967, to Shao-Tang Lee;
U.S. Pat. No. 3,508,724, granted April 28, 1970, to Stanley H. Scher and James C. Dunavant;
U.S. Pat. No. 3,624,751, granted Nov. 30, 1971, to Ronald F. Dettling;
U.S. Pat. No. 3,731,893, granted May 8, 1973, to Charles J. Stalmach, Jr.;
U.S. Pat. No. 3,785,591, granted Jan. 15, 1974, to Charles J. Stalmach, Jr.; and
U.S. Pat. No. 4,014,485, granted Mar. 29, 1977, to Laird D. Kinnaird and Seth B. Moorhead, Jr.

The above patents and the prior art that is discussed and/or cited therein should be studied for the purpose of putting the present invention into proper perspective relative to the prior art.

SUMMARY OF THE INVENTION

According to the present invention, aerodynamic drag is used for providing most of the change in velocity which is experienced by a space vehicle during a reentry. The space vehicle is provided with an aerodynamic braking member which is moved prior to its use from a stowed position aboard the space vehicle outwardly into an operational position in which it presents a large area braking surface extending generally laterally outwardly from the space vehicle.

The space vehicle is oriented to reenter nozzle-end first and the aerodynamic braking member is positioned immediately rearwardly of the nozzle. The main rocket motor is operated to generate coolant gases which are discharged out through the nozzle at rates sufficient to push the bow shock away from the nozzle and to provide a gaseous cooling layer forwardly of the aerodynamic braking surface, but without reducing the drag of the braking surface by any substantial amount.

According to an aspect of the invention, liquid oxygen and liquid hydrogen are used as fuels, both for producing thrust gases during travel of the space vehicle and for producing cooling gases during reentry.

According to another aspect of the invention, the aerodynamic braking member is an inflatable member and some of the hydrogen fuel is introduced into it, in a gaseous state, for inflating such member into its use configuration.

According to the intended use of the invention, a space vehicle that is to be recovered from outerspace for reuse is guided back towards the earth. As the vehicle approaches the earth's atmosphere it is oriented so that the nozzle of the main rocket motor leads. Then, the aerodynamic braking member is moved from its stowed position out into its operational position and the main rocket motor is operated to provide a cooling layer of gases for the large area anterior braking surface of the aerodynamic braking member. In this manner the necessary change in velocity of the space vehicle is achieved.

According to a further aspect of the invention, the aerodynamic braking member is jettisoned following vehicle slowdown to the proper velocity. Then the space vehicle is reoriented and operated to place it into a low earth orbit (LEO), for eventual recovery and refurbishment.

The space vehicle must be equipped with a new aerodynamic braking member prior to its next flight. However, the cost of such a refurbishment is substantially less than the cost of replacing ablative insulation.

Accordingly, a principal object of the invention is to provide an economical way of recovering a space vehicle for reuse.

Further objects, features and advantages of this invention are described below in the description of the preferred embodiments.

BRIEF DESCRIPTION OF THE DRAWING

In the drawing like element designations refer to like parts, and,

FIGS. 10-17 are operational state views of the space vehicle, depicting the several stages of the aerodynamic braking member while the space vehicle is being recovered.

DESCRIPTION OF THE PREFERRED EMBODIMENTS

Figure 1:
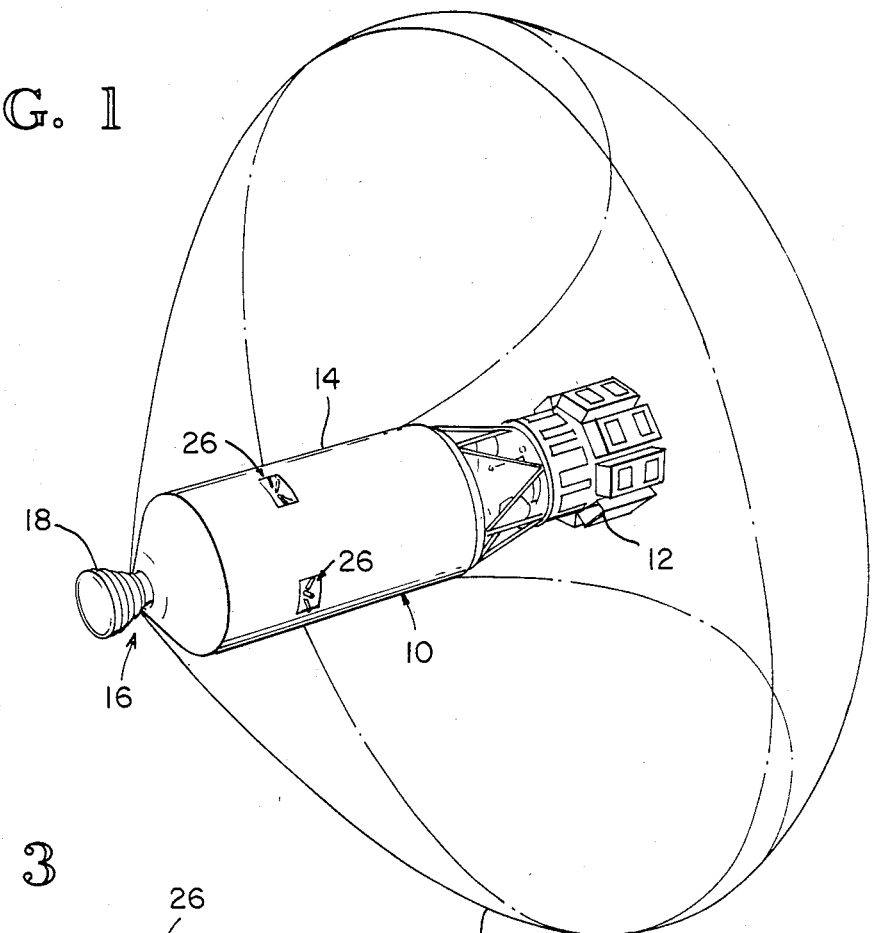
FIG. 1 is an isometric view of a space vehicle which is equipped with an aerodynamic braking system constructed in accordance with the present invention, such view showing the aerodynamic braking member in its operational position.
Figure 3:
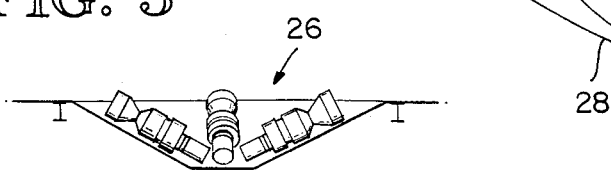
FIG. 3 is an enlarged scale fragmentary view of a side region of the space vehicle, showing a portion of a set of thrusters which are used for steering the space vehicle.
Figure 2:
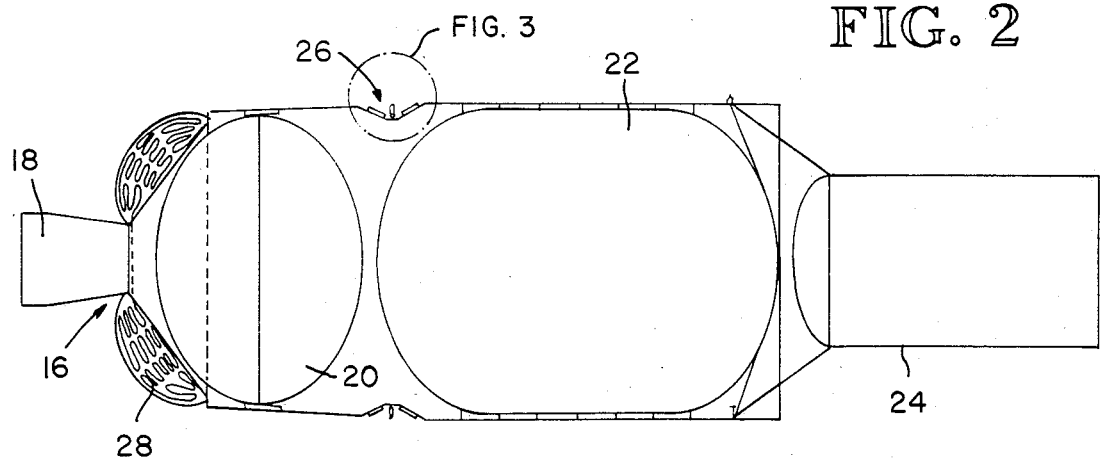
FIG. 2 is an axial sectional view of an embodiment of the space vehicle, with the braking member in its stowed position.

FIGS. 1-3 illustrate a space vehicle 10 of a type which might be used for carrying a pay load or cargo 12 out to a location in far out outerspace, e.g. out to a geosynchronous earth orbit (GEO).

The space vehicle comprises a body 14, shown in the shape of a cylinder, and a rocket motor 16 at one end of the body 14, including a rocket nozzle 18 oriented to discharge gases axially of the body 14. A pair of tanks 20, 22 for liquid bi-propellants, such as liquid oxygen (20) and liquid hydrogen (22), are contained within the body 14. Suitable apparatus of a conventional nature and forming no part of this invention is provided for metering and delivering the fuel components into the rocket motor 16.

A "pay load" carrying frame 24 is provided at the end of body 14 opposite the nozzle 18.

The rocket motor 16 constitutes the main rocket motor for the space vehicle 10. During normal operation the fuel components are combined within the rocket motor 16 to produce propulsion gases which discharge from the nozzle 18 and propel the space vehicle 10 in the well known manner. Space vehicle 10 is also provided with a plurality of small directional rockets or thrusters 26 (FIG. 3) which in a known manner are used for steering the space vehicle 10.

According to an aspect of the invention, an aerodynamic braking member, shown in the form of an inflatable bag 28, is connected to the vehicle and is movable from a stowed position adjacent the vehicle out into an operational position in which it projects generally laterally out from the space vehicle 10 and presents a large area conical anterior surface 32.

The presently preferred form of bag member 28 is toroidal in form. It includes a small diameter front end which is secured to the space vehicle 10 generally at the throat region 30 of the rocket nozzle 18. When deployed the bag 28 presents a large area anterior surface 32 which is conical in form. Surface 32 sweeps rearwardly and after reaching a maximum diameter starts decreasing in diameter and then makes a reverse curve back to the starting point at region 30. A plurality of straps 34 hold the bag 28 in position relative to vehicle 10. Each strap 34 is secured at one end 36 to a rear portion of the bag 28. The opposite end of each strap 34 is secured to the vehicle body 14 at a location 38 adjacent the end of body 14 opposite the rocket nozzle 18. The straps 34 are spaced circumferentially about the vehicle body 14. Straps 34 are long enough so that they will permit the deflated bag 28 to be moved towards nozzle 18 and folded into a compact package in the region immediately surrounding the nozzle throat 30.

The bag 28 is a completely closed structure. A plurality of gas inlets 41, 41' (FIGS. 4 and 5) are provided at the nozzle end of the vehicle body 14, for communicating a source of inflation gas within vehicle body 14 with the interior of bag member 28. One or more circular connectors (e.g. clamps 43) are used for securing the nozzle end of the bag 28 to the vehicle body 14. A similar type of connector 45 is used at location 38 for securing the vehicle ends of the straps 34 to the vehicle body 14. Each connector member 43, 45 includes an explosive device or squib which when activated will explode and cause the connector to break apart. When this happens the bag is released from the vehicle body.

Figure 4:
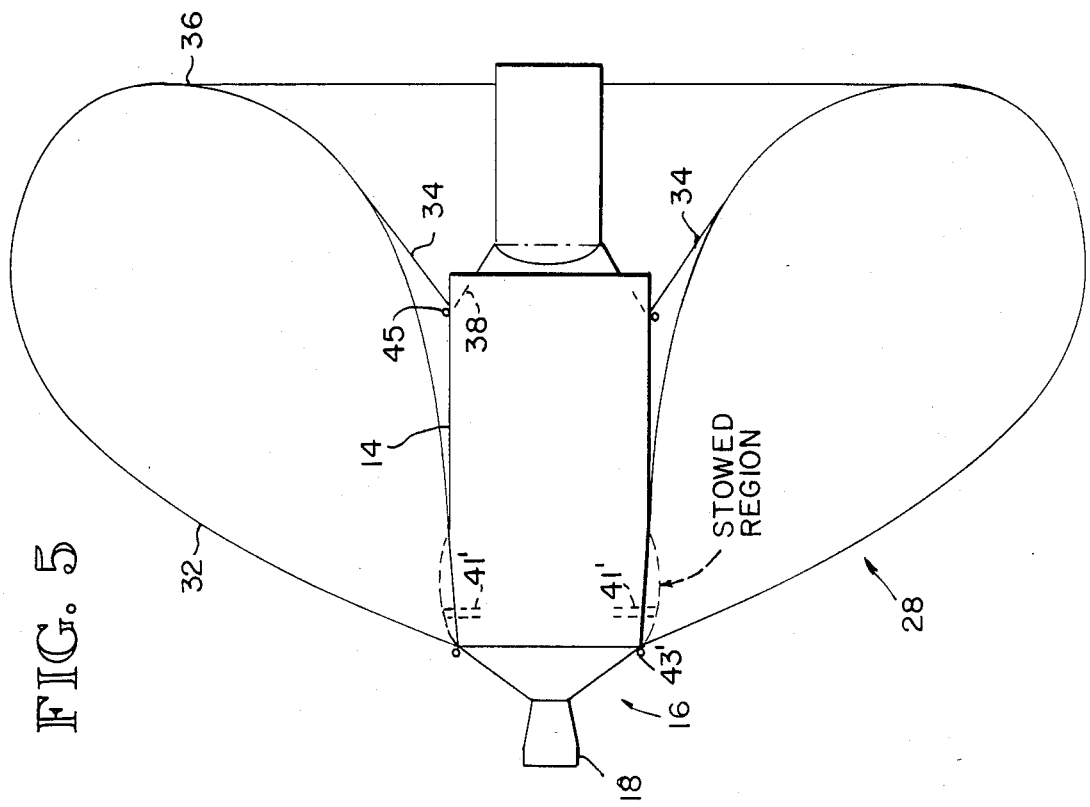
FIG. 4 is an axial sectional view of a first, preferred embodiment in which an inflatable aerodynamic braking member is secured at its forward end to the throat region of the nozzle of the main rocket motor, and is stowed at the end of the space vehicle, in an annular region immediately axially inboard of the nozzle throat.
Figure 5:
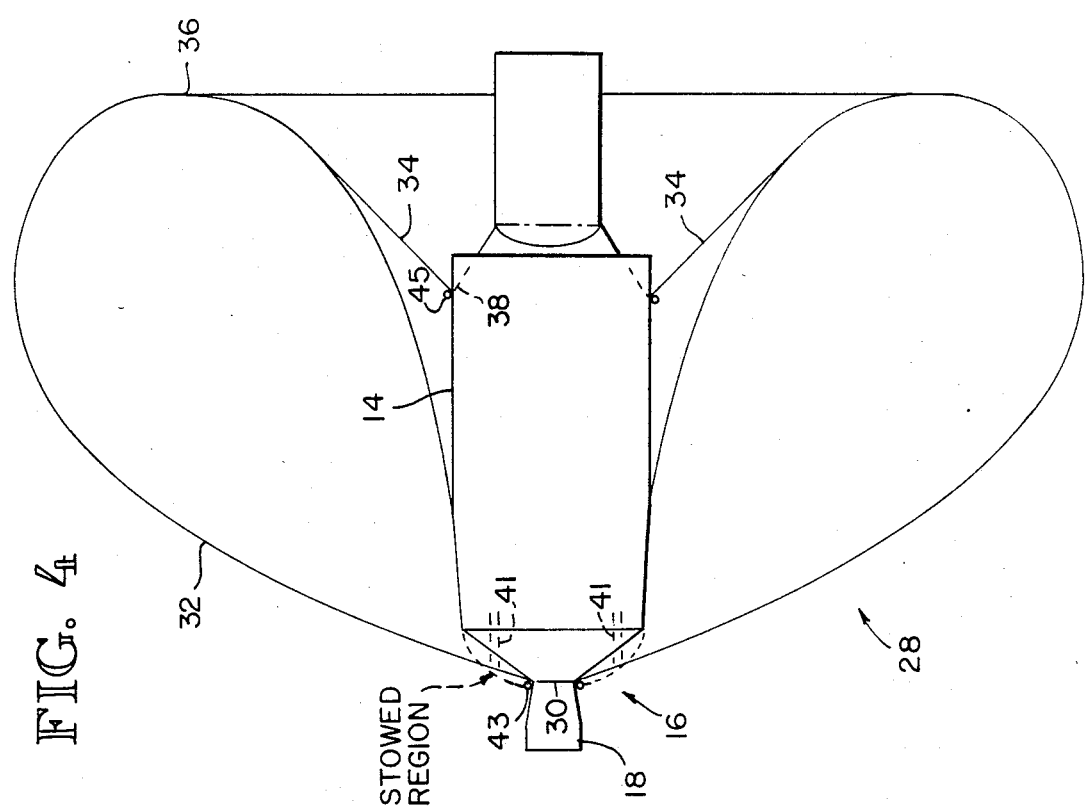
FIG. 5 is a view like 4, but of a modified embodiment in which the forward end of the inflatable aerodynamic braking member is secured to an edge region of the space vehicle, and is stowed within a peripheral region immediately axially inboard of such edge region.

The embodiment shown by FIG. 5 differs from the embodiment shown by FIG. 4 only in the location of the gas inlets 41', the connection 43' at the nozzle end of the vehicle body 14, and the stowed position of the bag.

FIG. 2 shows the bag 28 stowed at the nozzle end of the vehicle, in the annular end wall region substantially immediately surrounding the nozzle throat 30. The stowed bag 28 is enclosed by a cloth cover which may itself be secured in place by means of a circular connector which includes an explosive charge. The explosive charge is operated to sever the connector to in that manner release the cloth cover so that the bag 28 is free to be deployed.

Figure 6:
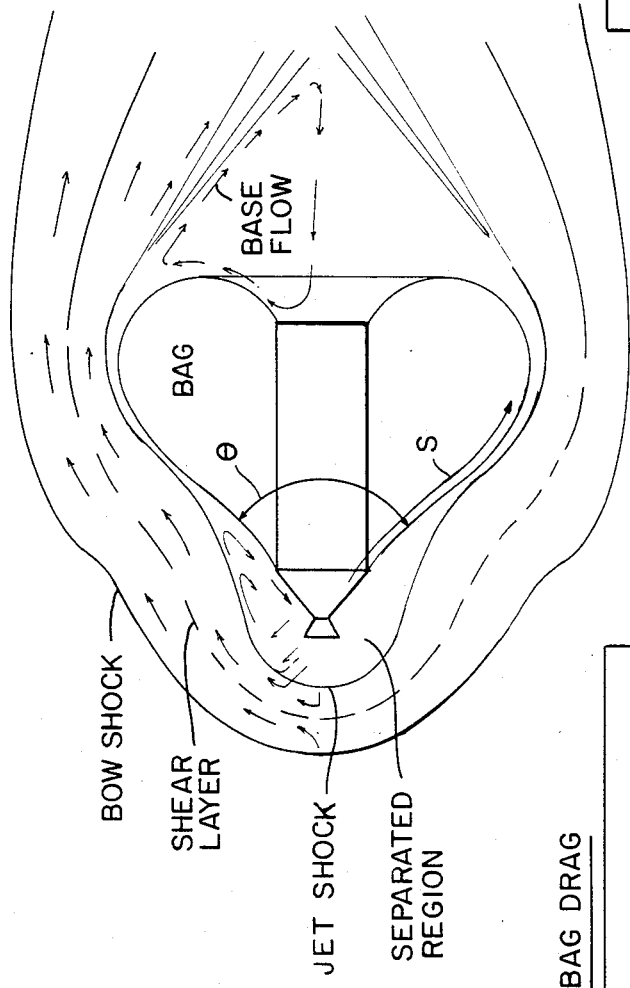
FIG. 6 is a flow field diagram of the form of inflatable aerodynamic braking member which is shown by FIG. 5.

FIGS. 1 and 4–6 show the general shape of the bag during travel of the space vehicle 10, nozzle end first, with bag 28 deployed. FIG. 6 shows the flow field which exists about the bag 28 during flight within the earth's atmosphere.

Figure 7:
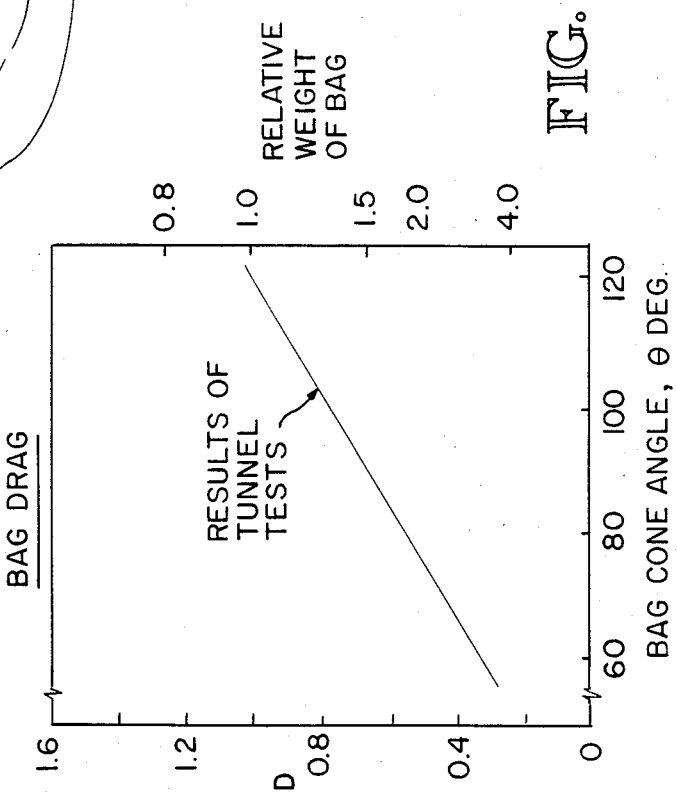
FIG. 7 is a graph of drag and relative weight of the braking member versus the braking member cone angle, in degrees.

FIG. 7 is a plot of bag cone angle θ (FIG. 6) vs. drag coefficient and the relative weight of the bag 28. This plot is the result of wind tunnel tests.

Figure 8:
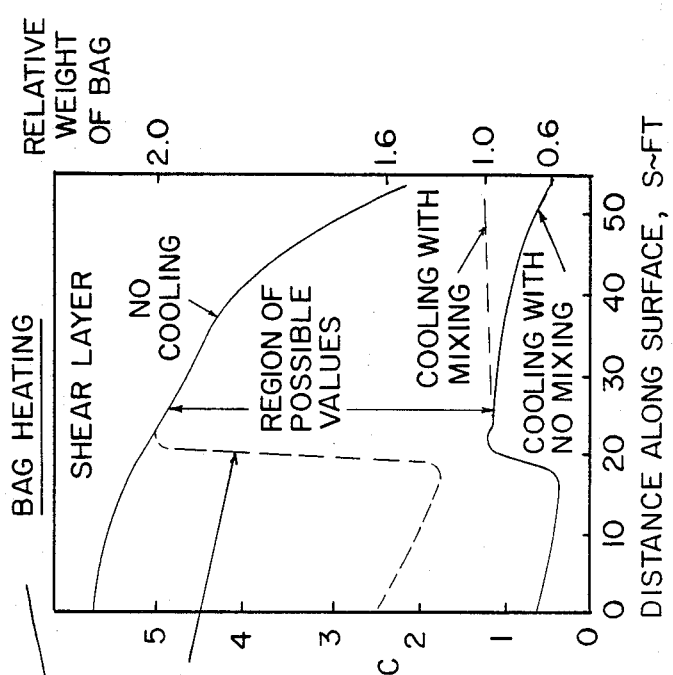
FIG. 8 is a graph of heat transfer rate, in BTU/FT2/SEC, and relative weight of braking member versus distance along braking surface in feet.

FIG. 8 is a graph of distance S along the bag surface, in feet, vs. heat transfer rate and relative weight of the bag. The graph of FIG. 8 includes the expected performance of a layer of coolant gases provided by the rocket motor 16, in a manner to be hereinafter described.

As previously described, when it is desired to propel the vehicle 10 along some chosen path of travel, the rocket motor 16 is operated to provide propulsive thrust. Of course, during such operation the rocket nozzle 18 is at the rear of the space vehicle 10 and the propulsive stream of gases is being discharged behind the vehicle, along a path coinciding with the longitudinal center line of the space vehicle 10.

Preparatory to making a reentry, the rocket motor 16 is shut off and the thrusters or directional rockets 26 are operated, in a well known manner, to reorient the space vehicle 10 so that the rocket nozzle 18 leads the space vehicle 10 as it continues moving towards the earth. The squib that is a part of the connector which serves to secure the fabric cover over the folded bag 28 is operated to remove the cover so that the bag 28 can be deployed. The bag 28 is deployed by introducing an inflation gas into it, through a plurality of nozzles which are provided adjacent where the bag is connected to the vehicle. The inflation gas may comprise a portion of one of the fuel components alone, e.g. hydrogen which is stored as a liquid but introduced into the bag in a gaseous state, or a combination of a gaseous fuel component and some other gas from a source carried by the vehicle, or such other source alone. Normal operation of the space vehicle 10 may produce a quantity of waste steam or water vapor which could be used to inflate, or at least help inflate, the bag 28.

Figure 9:
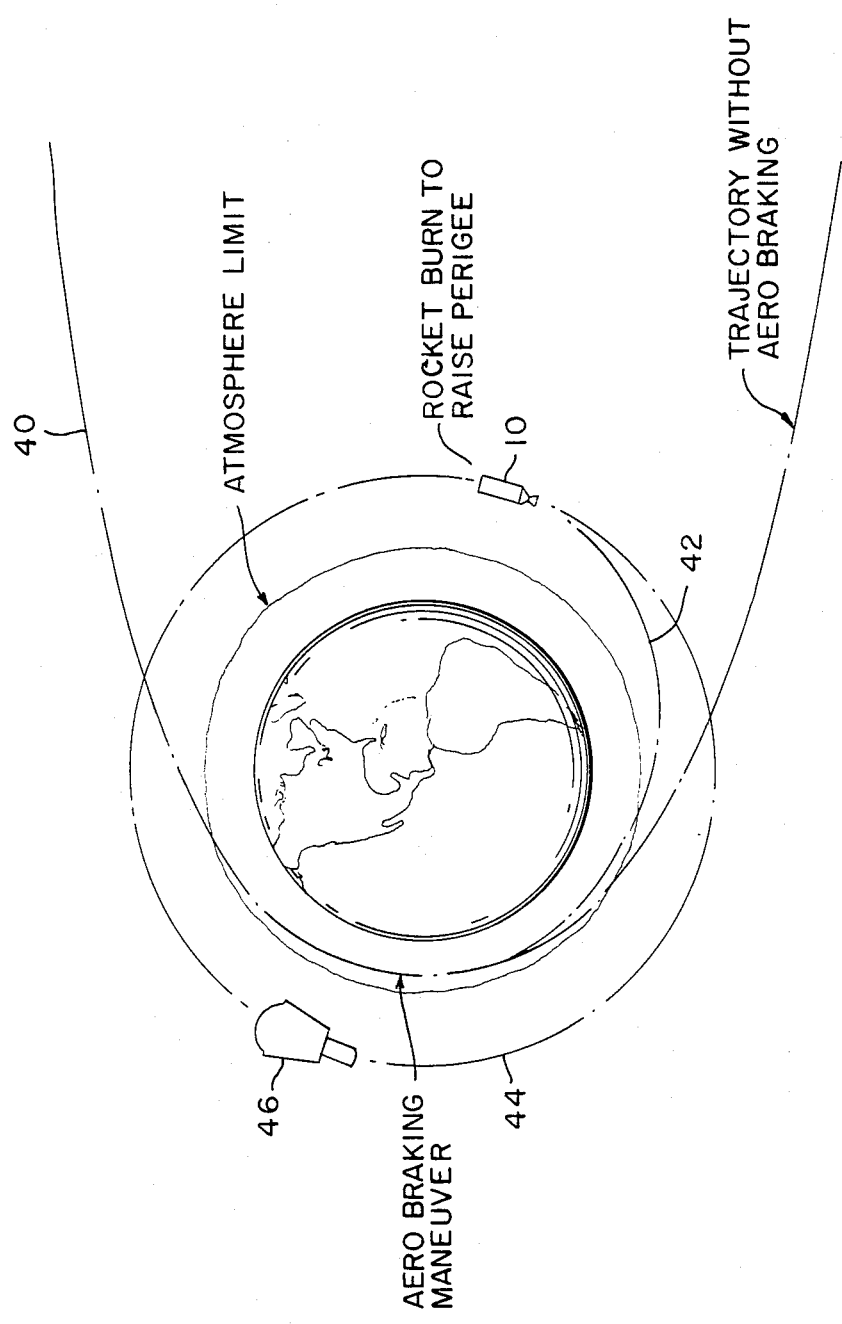
FIG. 9 is a diagram of the travel path of a space vehicle which is in the process of being recovered for reuse by use of the present invention.

FIG. 9 shows one possible use of the aerodynamic braking system of the present invention. The space vehicle 10 is brought from outer space back towards the earth along a path 40. Path 40 meets at a tangent with an orbit 42 which is substantially at the atmospheric limit, inside of a low earth orbit (LEO) 44. It is within this orbit 42 that the aerodynamic braking maneuver is performed.

Referring now to FIG. 10, the bag 28 is inflated or deployed into its reentry configuration. The main rocket motor 16 is operated to produce a quite low velocity stream of hot gases for providing a cooling layer of gases over the anterior or leading surface 32 of the bag 28 (FIG. 6).

FIG. 11 depicts the bag 28 in operation after the space vehicle 10 has encountered the earth's atmosphere.

Following the desired slow down, the explosive device which is a part of the rear connector is operated, to release the hold on the bag 28 at the rear end of the vehicle 10. At about the same time the bag 28 is vented so that the gases will be forced out from the interior of the bag 28.

As shown by FIG. 13, the deflated bag 28 is molded to the outer surface of the vehicle 10 by dynamic pressure acting on it during continued travel of the vehicle 10 along the atmospheric orbit 42. A short time following complete deflation of the bag 28, the explosive device that is a part of the front clamp or connector is operated to release the final connection between the bag 28 and the vehicle, so that the dynamic pressure will force the bag 28 completely off from the vehicle 10. This is depicted by FIG. 15.

Following jettisoning of the bag 28 the main rocket motor 16 is shut down (FIG. 16) and the thrusters 26 are operated to align the vehicle 10 along the desired trajectory. Then, the main rocket motor 16 is reignited and used for propelling (FIG. 17) the space vehicle 10 to bring it up into the low earth orbit 44 where it will remain until it meets with a recovery spacecraft, e.g. a space shuttle 46. The space vehicle 10 may be temporarily joined to the space shuttle and be refurbished while both vehicles 46, 10 are together moving in the orbit 44. Or, the space vehicle 10 may be picked up by the space shuttle 46 and taken back to the earth for refurbishment.

Refurbishment of the space vehicle 10 for another trip back into outer space involves equipping it with a new bag 28, a new bag cover, new explosively released connectors, etc. Even if it is necessary to return the space vehicle to earth for such refurbishment, the cost of refurbishment is substantially less than would be encountered if an ablating reentry shield were used.

The inflatable bag or "decelerator" may be of the type disclosed in a May 22, 1968, report by Goodyear Aerospace Corporation of Akron, Ohio, to the National Aeronautics and Space Administration, authored by R. Reed Barton and entitled "Development of Attached Inflatable Decelerators for Supersonic Application" (NASA CR 66613). The contents of this report are incorporated herein by this specific reference.

It is to be realized that the present invention may be embodied in other than the specific devices which are illustrated and described herein. It is intended that the specific disclosure of this document, which is of preferred embodiments and the best mode of the invention presently known by the inventor, is to be considered as illustrative and not in a limiting sense. The scope and content of the invention are to be determined by the appended claims.

What is claimed is:

1. An aerodynamic braking system for a space vehicle comprising a main rocket motor having a nozzle oriented to discharge propulsive gases from one end of the vehicle, wherein during use of the system the space vehicle will be traveling toward the earth's atmosphere nozzle end first, said aerodynamic braking system comprising:

an aerodynamic braking member carried by the space vehicle and movable prior to its use from a stowed position aboard the vehicle outwardly into an operational position in which it presents a large area braking surface extending generally laterally outwardly from the space vehicle; and means for producing gases within said main rocket motor, for discharge outwardly through the rocket nozzle, at a rate sufficient to provide a gaseous cooling layer along the anterior surface of the aerodynamic braking surface, but without substantially reducing the drag of the braking surface, so that such braking member will remain effective and reduce the velocity of the space vehicle down to a desired level.

2. An aerodynamic braking system according to claim 1, further comprising releasable connector means for securing the aerodynamic braking member to the space vehicle, and operable when released to permit jettisoning of the aerodynamic braking member from the space vehicle.

3. An aerodynamic braking system according to claim 1, wherein said aerodynamic braking member is an inflatable member and it is moved into its operational position by introducing a gas into it to inflate such member.

4. An aerodynamic braking system according to claim 3, wherein the means for producing gases includes at least one liquified gas stored aboard the space vehicle, and means for introducing some of such gas into the inflatable member, in the gaseous state, to inflate such member.

5. An aerodynamic braking system according to claim 4, wherein said liquified gas is hydrogen.

6. An aerodynamic braking system according to claim 3, wherein the inflatable aerodynamic braking member is stowed at the rocket motor end of the space vehicle and as it is being inflated it moves both radially outwardly and axially along the space vehicle toward the opposite end of the space vehicle, and when fully inflated it has a toroidal form and surrounds the space vehicle.

7. An aerodynamic braking system according to claim 6, wherein said inflatable aerodynamic braking member includes an inner wall portion which immediately surrounds the space vehicle when such member is inflated.

8. An aerodynamic braking system according to claim 3, further comprising releasable connector means for securing the inflatable aerodynamic braking member to the space vehicle, and operable when released to permit jettisoning of the aerodynamic braking member from the space vehicle.

9. An aerodynamic braking system according to claim 8, wherein the inflatable aerodynamic braking member is stowed at the rocket motor end of the space vehicle and as it is being inflated it moves both radially outwardly and axially along the space vehicle toward the opposite end of the space vehicle, and when fully inflated it has a toroidal form and surrounds the space vehicle.

10. An aerodynamic braking system according to claim 9, wherein said inflatable aerodynamic braking member includes an inner wall portion which immediately surrounds the space vehicle when such member is inflated.

11. An aerodynamic braking system according to claim 9, wherein the means for producing gases includes at least one liquified gas stored aboard the space vehicle, and means for introducing some of such gas into the inflatable member, in the gaseous state, to inflate such member.

12. An aerodynamic braking system according to claim 11 wherein said liquified gas is hydrogen.

13. An aerodynamic braking system according to claim 1, wherein the means for producing gases within said main rocket motor comprises liquid oxygen and liquid hydrogen fuels stored aboard the space vehicle, and means for introducing said liquid oxygen and liquid hydrogen into the rocket motor at a controlled rate, so that operation of the rocket motor can be controlled to produce a relative high thrust stream of gases when it is desired to use the main rocket motor for propelling the space vehicle, and a substantially throttled stream of gases when it is desired to use the gases for cooling the aerodynamic braking member.

14. An aerodynamic braking system according to claim 13, wherein said aerodynamic braking member is an inflatable member and is moved into its operational position by introducing a gas into it to inflate such member.

15. An aerodynamic braking system according to claim 14, wherein the system includes means for introducing some of said hydrogen fuel into the inflatable member, in the gaseous state, to inflate such member.

16. An aerodynamic braking system for a space vehicle comprising a main rocket motor having a nozzle oriented to discharge propulsive gases from one end of the vehicle, wherein during use of the system the space vehicle will be traveling toward the earth's atmosphere nozzle end first, said aerodynamic braking system comprising:
an aerodynamic braking member carried by the space vehicle and presenting a large area braking surface extending generally laterally outwardly from the space vehicle; and
means for producing gases within said main rocket motor for discharge outwardly through the rocket nozzle, at a rate sufficient to provide a gaseous cooling layer along the anterior surface of the aerodynamic braking surface, but without substantially reducing the drag of the braking surface, so that such braking member will remain effective and reduce the velocity of the space vehicle down to a desired level.

17. An aerodynamic braking system according to claim 16, further comprising releasable connector means for securing the aerodynamic braking member to the space vehicle, and operable when released to permit jettisoning of the aerodynamic braking member from the space vehicle.

* * * * *